United States Patent Office.

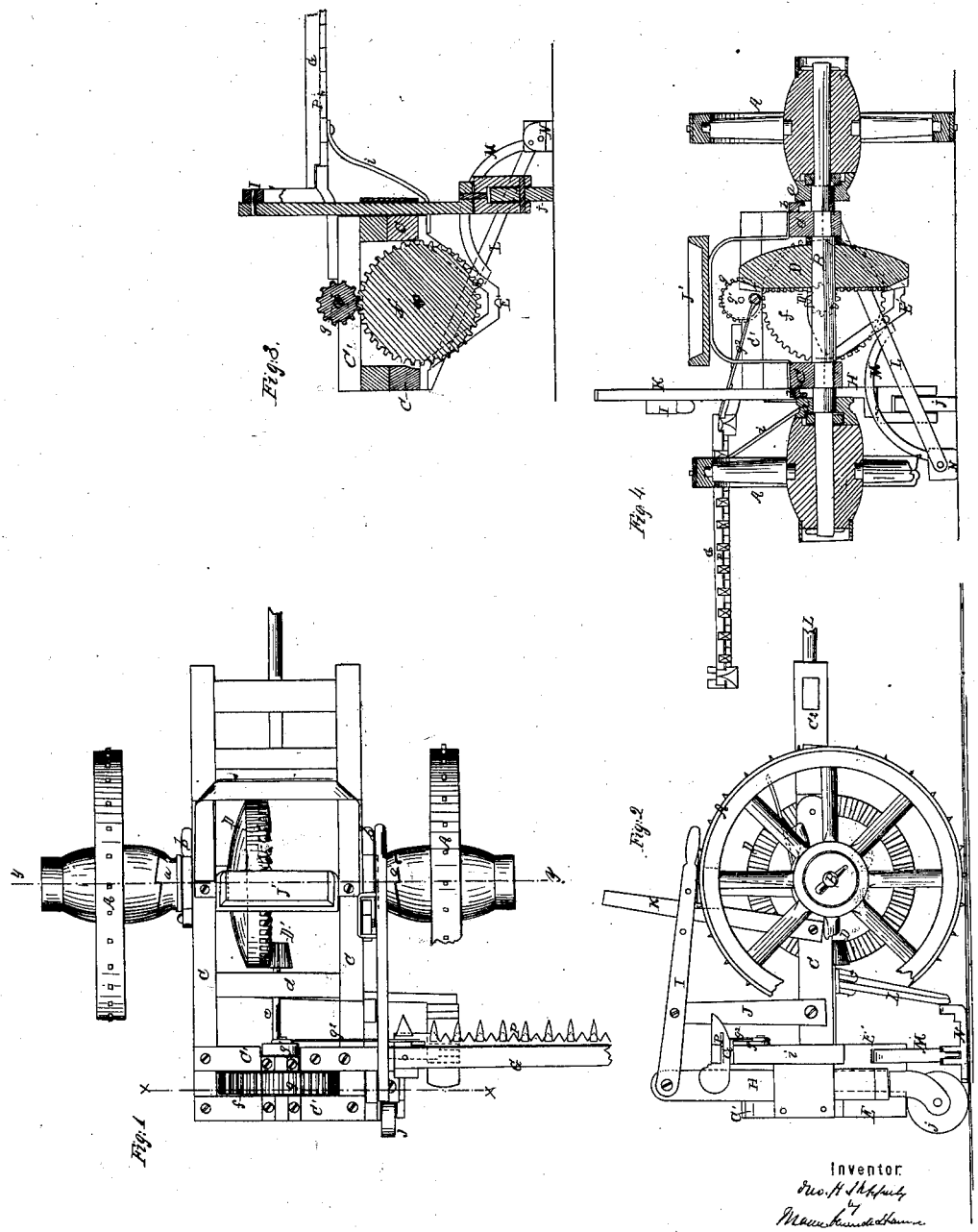

JOHN H. HEPPERLY, OF ELMIRA, ILLINOIS.

*Letters Patent No.* 62,487, *dated February* 26, 1867.

---

IMPROVEMENT IN COMBINED HEDGE TRIMMER AND MOWER.

---

*The Schedule referred to in these Letters Patent and making part of the same.*

---

TO ALL WHOM IT MAY CONCERN:

Be it known that I, JOHN H. HEPPERLY, of Elmira, in the county of Stark, and State of Illinois, have invented a new and improved Hedge Trimmer and Mower; and I do hereby declare that the following is a full, clear, and exact description thereof, reference being had to the accompanying drawings, making a part of this specification, in which—

Figure 1 is a plan view of the machine, arranged for trimming hedges.

Figure 2 is an elevation of one side of the machine.

Figure 3 is a cross-section, taken in the vertical plane indicated by red line $x\,x$, in fig. 1.

Figure 4 is a cross-section, taken in the vertical plane indicated by red line $y\,y$, in fig. 1.

Similar letters of reference indicate corresponding parts in the several figures.

This invention relates to a novel machine which combines in itself the elements of a hedge trimmer and a mower, and which can be used at pleasure for either purpose. It consists in adapting an adjustable carriage frame for sustaining upon top of it a cutting apparatus in a horizontal position for trimming hedges, and also for sustaining the same cutting apparatus beneath it in a position for cutting grass; in both of which positions the same gearing serves to operate the sickle, as will be hereinafter described.

To enable others skilled in the art to understand my invention I will describe its construction and operation.

In the accompanying drawings A A represent two wheels which are applied on an axle, B, and which support the draught frame C. These wheels are so applied to their axle B, by means of toothed clutches $a\,a$, that when the machine is moved backward the wheels will not turn their axle, but when it is moved forward the wheels will engage with and turn their axle. When it is desired to transport the machine from one place to another, and to stop the movements of the sickle, the clutches $a\,a$ are disengaged from the hubs of the transporting wheels, and kept in such condition by means of short curved arms $b\,b$, that are pivoted to the side beams of the draught frame C. On the axle B, between the two side beams of frame C, a large bevel spur-wheel, D, is keyed, which engages with the teeth of a pinion spur-wheel, $D'$. This pinion-wheel $D'$ is keyed upon a longitudinal shaft, $c$, which is supported in bearings upon a cross-bar, $d$; and upon the upper cross-bar of a rear hanger, E, a large spur-wheel, $f$, is keyed upon the longitudinal shaft $c$, and engages with a pinion spur-wheel, $g$, on a short shaft, $h$, which has an eccentric or crank-wheel, $g^1$, on its forward end, to the wrist pin of which the pitman $g^2$ is applied, as shown in figs. 1 and 2. The short shaft $h$ is supported in bearings upon an elevated frame, $C^1$, when the finger-beam G is arranged on top of this frame for trimming hedges; but when the machine is used for cutting grass the shaft $h$ is applied to the bottom of the two hangers E E', in which latter portion the large spur-wheel $f$ will engage with and rotate the pinion spur-wheel $g$ and its shaft just as well as when arranged above the wheel $f$. For hedge trimming the finger-beam G is bolted on top of the elevated position $C^1$ of the frame C, and further sustained by the inclined brace $i$, shown in figs. 2, 3, and 4. This finger-beam G and its teeth, and also the sickle P, may be constructed in the usual well-known manner. The rear end of the frame C is supported upon the ground by means of a caster-wheel, $j$, which is pivoted to the lower end of an upright sliding standard, H, that works in a guide on that side of the machine which is nearest the standing grass, or the hedge. To the upper end of the standard H the rear end of a lever, I, is pivoted, which lever proceeds forward and is pivoted to a standard, J. The front end of lever I is in a convenient position for being operated by the attendant whilst sitting upon the seat $J'$. A rod, K, which is pivoted at its lower end to the side of frame C, projects up through a staple on lever I, and by means of pins or other suitable fastening the lever I can be secured in any desired position. By moving this lever the attendant can raise or lower the rear end of frame C, and thus adjust the cutting apparatus to any desired height. To admit of such adjustment the draught-pole L is secured rigidly to a hinged frame, $C^2$, which is hinged to the front ends of the side bars of the frame C, as shown in figs. 1 and 2. When the machine is arranged for mowing, the finger-beam G is secured to the shoe N, which is pivoted to the outer ends of two transverse braces, L M. The front brace, L, is pivoted at its highest end to the frame C, and the brace M is pivoted to the front hanger E', within a slot which is formed therein. This rear brace M is curved or bowed upward to allow the caster-wheel $j$ freedom to swivel about its vertical axis.

Having described my invention, what I claim as new, and desire to secure by Letters Patent, is—

1. The combination, with a carriage having a hinged frame, C C², and rear adjusting device H I, of a cutting apparatus, and means for sustaining the same in an elevated position for trimming hedges, and also in a position for mowing, substantially as described.

2. The elevated frame C¹, in combination with the depressed hangers E E', adjustable frame C C², and means by which the cutting apparatus can be operated, whether in an elevated or a depressed position, substantially as described.

3. Arrangement of the lever I, support J, standards H K, the latter having a wheel, j, attached to it, in combination with the combined hedge trimmer and mower shown, all substantially as and for the purpose set forth.

JOHN H. HEPPERLY.

Witnesses:
WM. D. BLANCHARD,
O. A. BLANCHARD.